Dec. 8, 1953     C. E. TACK     2,661,818
ROTOR BRAKE
Filed July 13, 1949     2 Sheets-Sheet 1
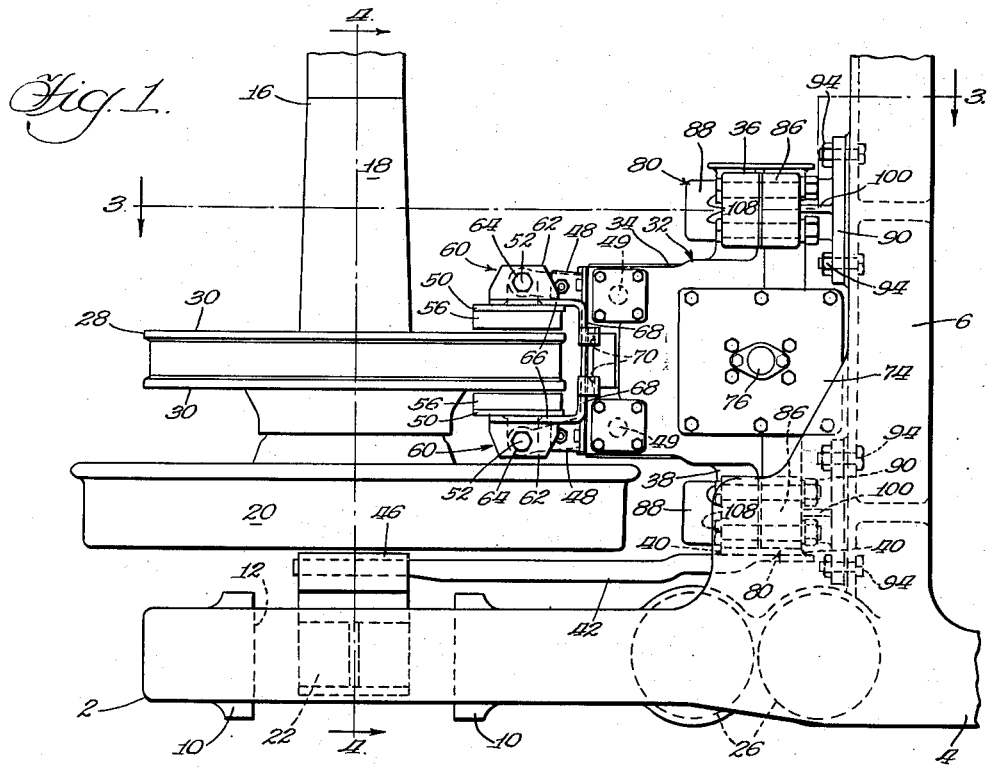
INVENTOR.
Carl E. Tack Dec. 8, 1953     C. E. TACK     2,661,818
ROTOR BRAKE
Filed July 13, 1949     2 Sheets-Sheet 2

INVENTOR.
Carl E. Tack
BY

Patented Dec. 8, 1953

2,661,818

UNITED STATES PATENT OFFICE 2,661,818

ROTOR BRAKE

Carl E. Tack, Chicago, Ill., assignor to American Steel Foundries, Chicago, Ill., a corporation of New Jersey Application July 13, 1949, Serial No. 104,453

6 Claims. (Cl. 188—59)

This invention relates to railway brake equipment and more particularly to a novel off-wheel brake arrangement wherein braking means are provided for decelerating one or more disks or rotors associated with the wheel and axle assemblies of a railway car truck.

The general object of the invention is to devise an off-wheel brake arrangement wherein brake disks are supported to rotate with each wheel and axle assembly, and a brake frame is carried by the truck frame adjacent each disk, each brake frame supporting a pair of levers with brake shoes for frictional engagement with opposite sides of the adjacent disk.

The invention is illustrated as applied to a conventional truck in which the truck frame is spring-supported from equalizers seated on the ends of the supporting wheel and axle assemblies. In such an arrangement the wheel and axle assemblies are accommodated for requisite universal as well as lateral, longitudinal, and vertical movements with respect to the truck frame to avoid transmitting shock to the truck frame and thence to the car body, as well understood in the art. To prevent transmission of shock from the wheel and axle assemblies to the truck frame through the brake means and to avoid high stressing of the disks and the brake means and relative canting or angling movements between the disks and the shoes of the brake means with resultant part-face engagement therebetween during braking application, provision must be made to permit the brake means to follow the movements of the wheel and axle assemblies during such braking application.

Various attempts have been made, with limited success, to provide satisfactory connections between the brake frame and the truck frame which will accommodate these movements. In general, the present connections employ split cylindrical rubber bushings compressed between cylindrical or tubular portions of the brake frame and cylindrical surfaces on the truck frame brackets, the bushings being intended to yieldingly support the brake frame and to properly position the same, and thus the shoes of the brake means carried thereby, with respect to the friction faces on the associated disk. It has been found, however, that these bushings do not compress uniformly around the tubular portions of the brake frame, resulting in eccentric mounting of the brake frame with respect to the brackets inasmuch as the cylindrical arrangement of the parts is conducive to the ready flow of the rubber to low pressure areas between the tubular portions and the support brackets. It has also been found that even though the tubular portions may initially be centered in the bushings, they are frequently moved off center by the braking forces and that the bushings, which are accommodated free flow, set in the eccentric position of the brake frame. These factors disrupt the intended relationship between the brake shoes and the disks.

It will be appreciated that in order to obtain full-face braking engagement between the brake shoes and the disks irrespective of the relative movements between the truck frame and the wheel and axle assemblies, the shoes and thus the brake frame and brake means must be properly positioned and maintained in such position with respect to the disks in view of the limited brake face areas on the disks.

It is an object of the present invention to provide mountings for the brake frame which correct the deficiencies hereinbefore discussed.

Another object of the invention is to provide a mounting arrangement for the brake frame which is simple to assemble and disassemble and wherein the parts cooperate to maintain the brake frame, and thus the brake shoes carried thereby, in proper position with respect to the related disk.

A more specific object of the invention is to provide novel mountings for the brake frame comprising supports or extensions on the brake frame received within brackets on the truck frame and resilient bushings compressed between the supports and the brackets, the supports being substantially square in cross section and the bushings being compressed between the sides of said supports and opposed complementary flat sides of the brackets.

A different object of the invention is to design a braking arrangement incorporating novel means for guiding the brake shoes with respect to the related disks and cooperating with the brake frame mounting to effect a satisfactory braking application.

These and other objects of the invention will become more apparent from the specification and drawings, wherein:

Figure 1 is a top plan view of a railway car truck incorporating the invention, only one quarter of the truck being shown inasmuch as it is substantially identical at opposite sides and opposite ends thereof;

Figure 2 is a side elevational view of the structure shown in Figure 1;

Figures 3, 4:
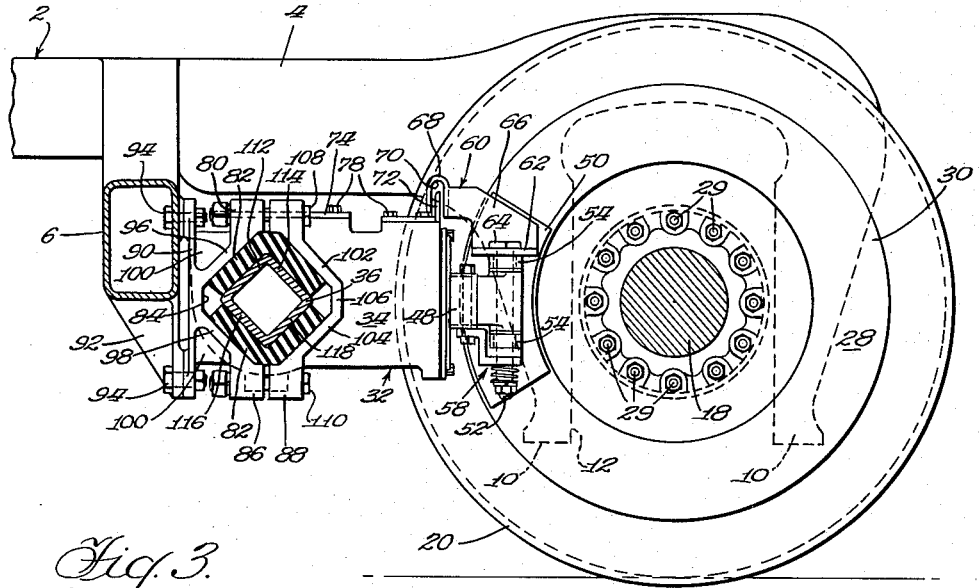
Figure 3 is a sectional view of the truck and brake arrangement taken substantially in the vertical longitudinal plane as indicated by the line 3—3 of Figure 1.
Figure 4 is a sectional view taken substantially in the transverse vertical plane as indicated by the line 4—4 of Figure 1 with the wheel and axle assembly removed to more clearly illustrate the invention.

In each of said views certain details may be eliminated where more clearly seen in other views.

Describing the invention in detail, the truck frame 2 comprises a side rail 4 at each side of the longitudinal center line of the truck and a transom 6 disposed at each side of the transverse center line of the truck, the transoms affording a means of connection to an associated bolster (not shown), said bolster affording support for the car body, as well understood in the art. Each end of each side rail 4 is provided with spaced pedestal jaws 10, 10 defining a pedestal opening 12, as best seen in Figure 2, each pedestal opening 12 receiving the associated journal box 14, fragmentarily illustrated in Figure 2, said journal box supporting the journal end of the associated wheel and axle assembly 16, said assembly comprising an axle 18 and a wheel 20 adjacent each end of the axle. On each journal box 14 is positioned an equalizer seat 22 affording positioning means for an equalizer 24. The truck frame is afforded a conventional resilient support from the equalizers by means of springs 26 diagrammatically shown in Figure 1.

A disk or rotor 28 is secured as by stud and nut assemblies 29 to each wheel 20 and presents friction surfaces 30, 30 at opposite sides thereof.

The braking means for the rotor 28 comprises a brake frame, generally designated 32, including a body portion 34 forming a cylinder housing, the body portion being provided with coaxial inboard and outboard trunnion extensions 36 and 38, the axis of which is disposed in horizontal alignment with the axis of assembly 16. The outboard end of extension 38 is connected as by welding at 40, 40 to a torque arm 42 clamped between spaced resilient means 44, 44 received and retained within a jaw 46 on the adjacent equalizer seat 22. A pair of levers 48, 48 are pivoted as at 49, 49 within the body portion 34 and project through the forward end of the housing at opposite sides of the rotor 28. A brake head 50 is pivoted on a substantially vertical axis to the outer end of each lever 48 as by a pin or bolt 52 extending through aligned openings in the lever and spaced lugs 54, 54 of the head. Each head 50 carries a brake shoe 56 for engagement with the adjacent surface 30 of the rotor 28. Balancing means, generally designated 58, are provided, cooperating with the associated bolt 52 for resisting rotation of the brake heads. Each bolt 52 also secures a guide 60 to the associated brake head, the guide comprising a substantially horizontal mounting portion or flange 62 which is sleeved over the associated pin and retained in assembled relationship with the brake head 50 between the head 64 of the pin and the upper brake head lug 54, as best seen in Figures 3 and 4. A vertical arm 66 is provided integral with the inner end of the mounting portion 62 and seats against the back of the related brake head 50, said arm 66 extending radially with respect to the associated brake head toward the body portion 34 of the brake frame. The outer end of the arm 66 is provided with a transverse guide portion 68 extending around the rear side of the associated brake head and shoe, said guide portion being shaped in the form of an inverted U to define a guide channel 70, as best seen in Figure 3, receiving an upright guide tongue or web 72 formed as an integral part of the top wall of the body portion 34 of the brake frame and extending transversely thereof along its forward edge substantially parallel to the vertical axial plane of bolts 52. It will be noted that the guide portion 68 is spaced at opposite sides from the tongue 72 to accommodate movement of the brake head assemblies toward and away from the rotor 28. The guide means, however, limit rotation of the brake heads on the pins 52 to prevent the shoes from being applied at a substantial angle with respect to the surfaces 30, 30 of the brake rotor and wearing away diagonally. It will be understood that the brake levers 48, 48 are actuated to apply the shoes to the rotor by power means or an air cylinder (not shown) within the housing, as is conventional practice, the cylinder being secured to a cover plate 74 provided with a nozzle 76 affording convenient attaching means for a fluid supply line (not shown). The cover plate 74 is secured to the top side of the housing 34 as by bolts 78.

The brake frame 32 is resiliently connected to or supported from the truck frame by means of brackets, generally designated 80, 80, and resilient bushings 82, 82 interposed between the brackets 80 and the respective trunnion extensions 36 and 38. It will be noted that each extension 36 and 38 is nonround, as best seen in Figure 3, and, as shown, is preferably square in cross section with diagonally opposed corners thereof at the top and bottom thereof. Each trunnion extension is received within a substantially square socket or opening 84 defined by jaws or clamps 86 and 88 of the associated bracket 80. Jaw 86 is provided with a substantially vertical mounting wall 90 secured to the adjacent transom and bracket 92 thereon as by bolts 94, 94. The jaw 86 (Figures 2 and 3) comprises upper and lower webs 96 and 98 disposed substantially at right angles to each other and connected to the mounting wall 90 intermediate the ends thereof. The connections between webs 96 and 98 and wall 90 are reinforced by gussets 100. The jaw 88 is provided with upper and lower webs 102 and 104 disposed substantially at right angles to each other and connected to each other as at 106. The upper ends of walls 96 and 102 extend generally vertically and are interconnected as by bolts 108, 108 and the lower ends of walls 98 and 104 extend generally vertically and are interconnected to each other as by bolts 110, 110. The upper bushing 82 is disposed between walls 96 and 102 and the walls 112 and 114 of the associated brake frame extension, and the lower bushing 82 is compressed between walls 98 and 104 and walls 116 and 118 of said extension. It will be understood that by tightening the bolts 108 and 110, the desired compression of the bushings 82, 82 is obtained. It will be appreciated that the construction discussed is free from the defects mentioned in connection with the cylindrical arrangements inasmuch as any tendency for the rubber or other resilient material constituting the rubber bushings to flow around the associated extension is restricted inasmuch as the angularity of the parts presents bottle necks which resist the flow of the material. For example, any tendency of the portion of the rubber bushing 82 between walls 96 and 112 to flow into the space between walls 102 and 114 is restricted by the narrow space between the apex or corner formed by walls 112 and 114 of the extension and the opposed apex or corner formed by the walls 96 and 102. Flow of the bushings is accommodated into the space at the horizontally opposed corners to accommodate compression of the bushings, thus further restricting any tendency on the part of the material to crowd into the spaces between the bracket and extension walls. Furthermore, during relative rotation between the brake frame and the brackets 80, the apices or corners of the extension and the sides of the associated jaws provide bottlenecks which resist flow of the material around the extension. The torque arm 42 cooperates with pads 44 to resist rotation. It will be readily noted that this construction not only prevents shifting of the parts, but is extremely simple and may be easily assembled and disassembled and that the parts may be easily adjusted to properly position the brake frame.

I claim:

1. In a brake support arrangement, a truck frame, a pair of spaced brackets connected to said truck frame, each bracket comprising a pair of clamping members formed and arranged to define a substantially square opening with two of the diagonally opposed corners thereof disposed substantially in vertical alignment and the other two corners thereof disposed in substantially horizontal alignment, a brake frame comprising a T-shaped housing having a body portion interposed between said brackets, said horizontal bar of the T being formed as a tubular trunnion extension on each side of said portion substantially square in cross section and extending through the adjacent opening, two of the diagonally opposed corners of each extension being disposed substantially in vertical alignment with the corresponding corners of the associated opening and the other two corners of each extension being disposed substantially in horizontal alignment with the corresponding corners of the associated opening, and a pair of resilient pads in each opening disposed against the top and the bottom of the associated extension, each pad having a center portion disposed between opposed vertical corners of the associated opening and extension and having adjacent portions disposed and compressed between adjacent surfaces of the related extension and opening.

2. In a brake arrangement for a railway car truck comprising a truck frame, a brake frame including a T-shaped housing having a body portion, the horizontal bar of said T comprising substantially coaxial trunnion extensions at opposite sides of said body portion, said extensions being substantially square in cross section, brackets carried by said truck frame at opposite sides of said body portion, each bracket including a pair of jaws formed and arranged to define a substantially square opening receiving the adjacent extension, spaced pads of resilient material within the opening in each bracket interposed between the sides of the related jaw opening and opposed sides of the associated extension, and means adjustably connecting the jaws of each pair for drawing the same against the associated pads and compressing the pads against the related extension.

3. In a brake support arrangement, a truck frame comprising a transverse member, a pair of spaced brackets carried by said member and each comprising a plurality of adjustably connected elements formed and arranged to define a quadrilateral opening therebetween, a T-shaped brake frame housing having a body portion interposed between said brackets, the horizontal bar of said T comprising quadrilateral trunnion extensions at opposite sides of said portion and each extending through the opening in the adjacent bracket, each extension and associated opening having diagonally opposed corners thereof disposed in substantial vertical alignment, and top and bottom resilient pads in each opening centered at respective corners and compressed at opposite ends thereof between adjacent sides of the related opening and extension.

4. In a brake support arrangement, a truck frame comprising a transverse member, spaced support means carried by said member with openings aligned transversely of said truck frame, each opening being defined by a plurality of angularly related sides, a T-shaped brake frame housing comprising a body having transverse trunnion portions extending through said openings, said portions being formed and arranged with sides parallel to the sides of the related opening, and resilient means within each opening compressed between the sides thereof and the opposed sides of the related portion.

5. In a brake arrangement for a railway car truck, a wheel and axle assembly including a friction element rotatable therewith, a truck frame resiliently supported therefrom and including a transverse member disposed at one side of said assembly, a support structure disposed between said member and said assembly and comprising a T-shaped housing having a body portion aligned with said element longitudinally of said truck frame, the horizontal bar of said T comprising coaxial extensions intermediate the ends of the body portion and projecting transversely of said truck frame, the axis of said extensions being disposed in horizontal alignment with the axis of said assembly, said extensions being quadrilateral in cross section, support means on said member having quadrilateral openings receiving respective extensions, the sides of said openings paralleling the sides of the respective extensions, resilient pads compressed between the sides of respective extensions and openings, brake means carried by said body portion including friction means cooperating with opposite sides of said element, and a torque arm rigidly connected to one of said extensions and yieldingly connected to said assembly.

6. In a brake arrangement for a railway car truck, a wheel and axle assembly including a friction element rotatable therewith, a frame resiliently supported from the assembly, a brake support housing disposed in longitudinal alignment with the element, trunnion supports extending from opposite sides of said housing intermediate its ends and transversely thereof and also transversely of the truck, said supports being coaxial and polygonal in cross section, support means on said frame having polygonal openings complementally receiving the respective trunnions, resilient pads compressed between the associated sides of the respective trunnions and openings, and brake means carried by the housing engageable with the element.

CARL E. TACK.

References Cited in the file of this patent

UNITED STATES PATENTS

| Number | Name | Date |
| --- | --- | --- |
| 667,037 | Richter et al. | Jan. 29, 1901 |
| 1,729,381 | Golden | Sept. 24, 1929 |
| 2,355,122 | Tack | Aug. 8, 1944 |
| 2,382,870 | Gaenssle et al. | Aug. 14, 1945 |
| 2,383,376 | Gaenssle | Aug. 21, 1945 |
| 2,416,820 | Coombes | Mar. 4, 1947 |
| 2,436,136 | Baselt | Feb. 17, 1948 |
| 2,467,356 | Eksergian | Apr. 12, 1949 |